US008588041B1

(12) United States Patent
Schillinger, Jr.

(10) Patent No.: US 8,588,041 B1
(45) Date of Patent: Nov. 19, 2013

(54) SYSTEM, ARTICLE AND METHODS FOR RECORDING AND/OR STORING DIGITAL DATA IN A VEHICLE

(71) Applicant: Safety Vision, LP, Houston, TX (US)

(72) Inventor: Jeffrey John Schillinger, Jr., Tomball, TX (US)

(73) Assignee: Safety Vision, LP, Houston, TX (US)

( * ) Notice: Subject to any disclaimer, the term of this patent is extended or adjusted under 35 U.S.C. 154(b) by 0 days.

(21) Appl. No.: 13/789,203

(22) Filed: Mar. 7, 2013

Related U.S. Application Data

(60) Provisional application No. 61/692,520, filed on Aug. 23, 2012.

(51) Int. Cl.
*G11B 31/00* (2006.01)
*H04B 1/00* (2006.01)

(52) U.S. Cl.
USPC ............................................. 369/21; 381/86

(58) Field of Classification Search
USPC ............. 369/21, 24.01, 53.18, 53.21; 360/60, 360/75, 69, 78.12; 381/86, 17, 77; 386/361
See application file for complete search history.

(56) References Cited

U.S. PATENT DOCUMENTS 7,321,532 B2 * 1/2008 Chen ........................... 369/53.18
7,760,456 B2 * 7/2010 Ding et al. ....................... 360/60

* cited by examiner

*Primary Examiner* — Ali Neyzari
(74) *Attorney, Agent, or Firm* — E. Randall Smith; Jones & Smith, LLP (57) ABSTRACT

A method of storing digital data in a moving vehicle includes providing first and second digital data storage devices in the vehicle and, while the vehicle is moving, transmitting the digital data to the first digital data storage device and maintaining the second digital data storage device in an "off" or "sleep" mode. While the vehicle is stationary, the second digital data storage device is activated into an "on" mode data is transferred from the first to the second digital data storage device.

23 Claims, 4 Drawing Sheets

SYSTEM, ARTICLE AND METHODS FOR RECORDING AND/OR STORING DIGITAL DATA IN A VEHICLE

This application claims the benefit of U.S. Provisional Patent Application Ser. No. 61/692,520, filed Aug. 23, 2012 and entitled "Apparatus and Methods for Recording and/or Storing Digital Data in a Vehicle", which is hereby incorporated by reference herein in its entirety.

FIELD OF THE DISCLOSURE

The present disclosure relates to apparatus and methods for recording and/or storing digital data in a vehicle and, more particularly, to reducing the likelihood of damage or loss of the digital data due to movement, shock and/or vibration during operation or movement of the vehicle.

BACKGROUND

It is very important in many industries to be able to record, store and access digital data obtained in a mobile environment, such as on vehicles (e.g. police cars, mass transit, trains or trucks). The data is often real-time digital video data, but may include GPS data, on-board event data or any among desired types of data. With many presently known digital data storage systems used in a mobile environment, the data is often damaged or lost, or the data storage devices are damaged, due to movement, vibration or shock experienced during operation of the vehicle. For example, when the vehicle hits a bump, the storage device or data storage media therein may become damaged. In other known systems, the digital data storage device may be shock-resistant, but unable to store the desired quantity of data, rendering these systems impractical. Thus, there is a need for improved apparatus, systems and methods for recording and/or storing data on a vehicle.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features merely because of the mention thereof herein.

Accordingly, there exists a need for improved systems, articles and methods useful in connection with recording and/or storing data in a vehicle having one or more of the attributes or capabilities described or shown in, or as may be apparent from, the other portions of this patent.

BRIEF SUMMARY OF THE DISCLOSURE

Various embodiments of the present disclosure involve a method of storing digital data in a moving vehicle and protecting the data from damage or loss due to vibration, shock or movement that may occur while the vehicle is operating. The method includes providing first and second digital data storage devices in the vehicle. The first digital data storage device does not include any moving parts. The second digital data storage device includes moving parts and a greater storage capacity than the first digital data storage device. While the vehicle is moving during typical operating conditions, digital data is transmitted to the first digital data storage device. The first storage device reliably stores the digital data without damage to or loss thereto while subject to movement, vibration and shock due to operation and movement of the vehicle. The second storage device in maintained an "off" or "sleep" mode. While the vehicle is stationary, the second storage device is activated into an "on" mode and digital data is transmitted from the first storage device to the second digital data storage device.

In many embodiments, the present disclosure involves a method of storing real-time digital data in a moving vehicle and protecting the data from damage or loss due to vibration, shock or movement that may occur while the vehicle is operating. The method includes providing at least one hard disk drive and at least on solid state drive on the vehicle. While the vehicle is moving, digital data is transmitted to the solid state drive on a continuing basis and the hard disk drive is maintained in an "off" or "sleep" mode. While the vehicle is stationary, in response to computer software receiving notification of at least one required trigger event, the hard disk drive is activated into an "on" mode. The transmission of digital data to the solid state drive is suspended, and digital data is transmitted from the solid state drive to the hard disk drive. After the digital data is transmitted to the hard disk drive, the transmission of data to the solid state drive is resumed and the hard disk drive is placed into an "off" or "sleep" mode.

In various embodiments, the present disclosure involves an article for use on a vehicle. The article includes a machine readable memory that provides instructions, which when executed by a machine, cause the machine to perform operations including the following: while the vehicle is moving, transmitting digital data to a shock-resistant memory device on a continuing basis and maintaining a large capacity memory device in an "off" or "sleep" mode; receiving notification of at least one required trigger event while the vehicle is stationary, and in response thereto, activating the large capacity memory device into an "on" mode, suspending the transmission of digital data to the shock-resistant memory device and transmitting digital data from the shock-resistant memory device to the large capacity memory device; and, after the digital data is transmitted to the large capacity memory device, resuming the transmission of data to the shock-resistant memory device and placing the large capacity memory device into an "off" or "sleep" mode.

The present disclosure includes embodiments of a system for storing real-time digital data in a vehicle and protecting the data from damage or loss due to movement that may occur while the vehicle is operating. The system includes at least one hard disk drive and at least one solid state drive mounted in the vehicle. The solid state drive does not include any internal moving parts, while the hard disk drive has internal moving parts and a greater digital data storage capacity than the solid state drive. At least one computer mounted in the vehicle includes a machine readable memory that provides instructions, which when executed by the computer, cause the computer to perform operations including: while the vehicle is moving, transmitting digital data to the solid state drive on a continuing basis from one or more data source mounted in the vehicle and maintaining the hard disk drive in an "off" or "sleep" mode; when the vehicle is stationary, receiving notification of at least one required trigger event, activating the hard disk drive into an "on" mode, suspending the transmission of digital data to the solid state drive, and transmitting digital data from the solid state drive to the hard disk drive; and after the digital data is transmitted to the hard disk drive, resuming the transmission of data to the solid state drive and placing the hard disk drive into an "off" or "sleep" mode.

Accordingly, the present disclosure includes features and advantages which are believed to enable it to advance vehicle data storage technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PRESENTLY PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Figure 1:
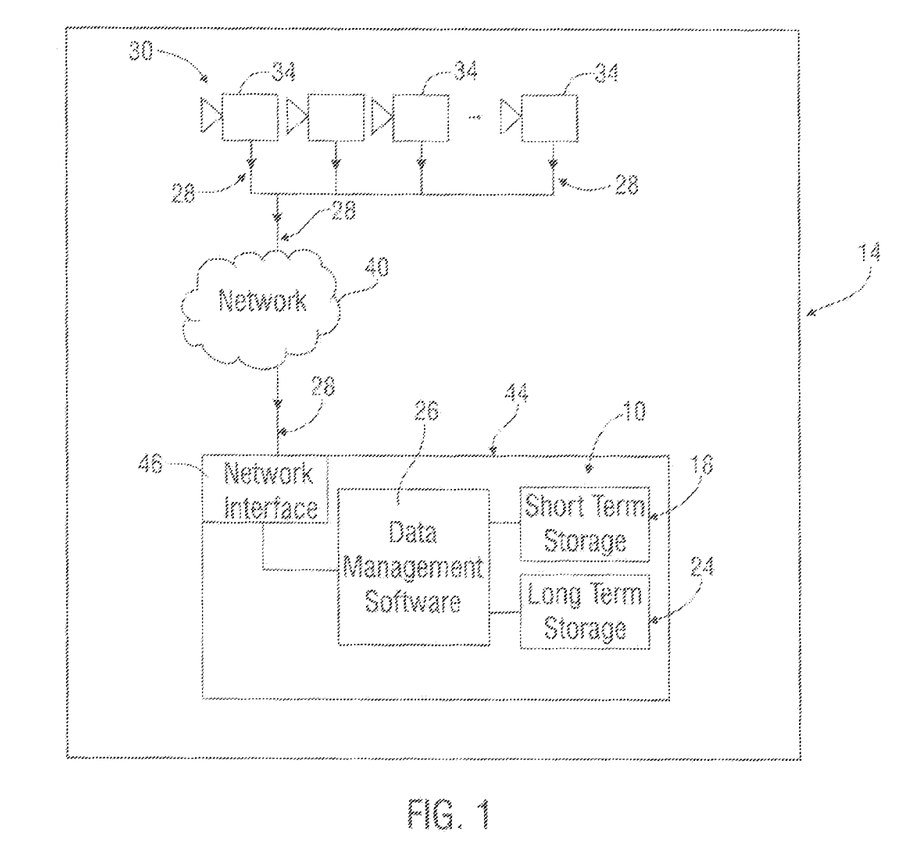
FIG. 1 is a system diagram including an embodiment of a data management system useful for recording and/or storing data in a vehicle in accordance with the present disclosure.

Referring initially to FIG. 1, an embodiment of a data storage system 10 in accordance with the present disclosure is shown. The data storage system 10 is useful for recording and/or storing data in a vehicle 14. As used in all parts of this patent application, the term "vehicle" means any type of one or more movable carrier or other unit, including, without limitation, an automobile, truck, bus, train, tram, light rail, tractor, trailer, cart, sled, water-borne vessel, barge, platform, drilling rig, watercraft, aircraft, spacecraft, or other mode or means of conveyance or transport, or other device by which something may be physically carried or moved, whether by wheels, tracks, runners or other mode or technology.

The data storage system 10 of this embodiment includes at least one shock resistant memory device (SRM) 18, at least one large capacity memory device (LCM) 24 and data management computer software 26. The illustrated SRM 18 is provided, at least, for the purpose of receiving and storing data 28 from one or more data source 30 while the vehicle 14 is moving. The exemplary LCM 24 is configured to receive data from the SRM 18, preferably while the vehicle 14 is stationary, and can retain the data thereafter, including while the LCM 24 is in an "idle", "off" or "sleep" mode during operation of the vehicle 14. The illustrated data management software 26 is configured to assist in transferring data from the SRM 18 to the LCM 24.

As used in all parts of this patent application, the terms "shock resistant memory device", SRM and variations thereof refer to one or more digital data storage and/or recording medium that is generally able to receive and store data while a vehicle is moving without more than nominal risk of failure, malfunction or damage to itself or data stored thereon due to typical vibration, movement or shock caused by movement of the vehicle during normal vehicle operations. Possible examples of SRM's include, without limitation, digital data recording and/or storage media that does not employ any internal moving mechanical components, such as permanent solid state memory media or data storage devices, solid state drives, DRAM-based devices, flash memory devices, including memory cards, USB flash drives, SRM cards, CF cards, micro-SRM cards, and similar devices capable of general storage of data. However, any other suitable SRM may be used.

As used in all parts of this patent application, the terms "large capacity memory device", LCM and variations thereof refer to one more digital data storage and/or recording medium that has a larger data storage capacity than the SRM, and is capable of retaining relatively large amounts of data for a long time during and after movement of the vehicle during normal vehicle operations. Possible examples of LCM's include, without limitation, digital data storage media that includes one or more internal moving mechanical components and/or is less expensive than an SRM, such as, without limitation, hard disk drives, floppy disks, other electromechanical devices containing spinning disks and movable read/write heads, and similar devices capable of sufficiently high capacity storage of data as dictated by each particular application. Likewise, any other suitable LCM may be used.

In the illustrated embodiment, the SRM 18 is a high-performance, solid-state drive and the LCM 24 is a removable, reusable, large memory capacity, hard disk drive. An example currently commercially available SRM 18 that may be used in some embodiments of the data storage system 10 is the 128 gigabyte (GB) solid-state drive model number MZ-7PC128B/WW sold by Samsung. An example currently commercially available LCM 24 that may be used in some embodiments of the data storage system 10 is the 1 terabyte (TB) hard disk drive model WD10TPVT sold by Western Digital, respectively.

Still referring to FIG. 1, any desired quantity, format and type of data 28 may be transferred to and stored in the exemplary SRM 18 and LCM 24 in any suitable manner. In the embodiment shown, the data source 30 includes multiple digital video cameras 34 mounted in the vehicle 14, while the data 28 includes digital video data. However, the present disclosure is not limited to the use of video cameras 34 and digital video data. Any other suitable type of data source 30 may be used.

In this embodiment, while the vehicle 14 is moving, the data 28 is transmitted from the cameras 34 via a network 40 to a data management system 44. The data management system 44 may have any suitable form, configuration and operation. In this example, the cameras 34 communicate with the data management system 44 via data transmission cables. However, in other embodiments, the data management system 44 may have another suitable form and the network 40 may be wireless.

Still referring to the embodiment of FIG. 1, the illustrated data management system 44 includes one or more network interface 46 for communicating with the network 40 and receiving the data 28, as is and becomes further know. The exemplary system 44 is also shown including the data management software 26 useful to route the data 28 to the SRM 18 and later to the LCM 24, and may, if desired, also be configured to process and/or organize the data 28 (e.g., convert video camera output into video data). In this embodiment, the routing of data 28 from the data source(s) 30 to the SRM 18 occurs on a continuing or repeating, generally real-time basis. For example, if the vehicle 14 is a bus, video may be recorded by the cameras 34 on an ongoing basis throughout the day (or other time period) while the bus is in use. As the video is recorded (or at pre-determined times), video data is transmitted to the exemplary SRM 18. At the same time, the illustrated LCM 24 is in an "idle", "off" or "sleep" mode. For example, when the LCM 24 is a hard disk drive, its moving parts may be in a parked position.

Still referring to FIG. 1, at one or more desired time, data is transferred from the illustrated SRM 18 to the LCM 24. In this embodiment, this occurs when the vehicle is stationary. For example, when the vehicle 14 is a bus, the system 10 may be designed so that when the bus is parked (e.g., after each day of use), the data management software 26 wakes up the LCM 24 and causes the transfer of data 28 stored on the SRM 18 to the LCM 24. The exemplary LCM 24 has the capacity to store the data received from the SRM 18 along with data transmitted thereto from the SRM 18 on one or multiple additional days (or other time periods). Thus, the exemplary LCM 24 has the capacity to store any desired (reasonable) quantity of data 28. If desired, the memory of the SRM 18 may be cleared out for use the next day (or other designated time period).

Thus, when the exemplary vehicle 14 is most vulnerable to movement, vibration and/or shock, data is written to the SRM 18 and the LCM 24 is generally safe from potential damage. When the vehicle 14 is parked or stationary, data can be safely transferred to and stored in the illustrated LCM 24. In this example, the SRM 18 provides optimal shock resistance, performance and error tolerance in a mobile environment and is used for short-term or temporary data storage, while the LCM 24 provides greater memory capacity for longer term data storage.

Figure 2:
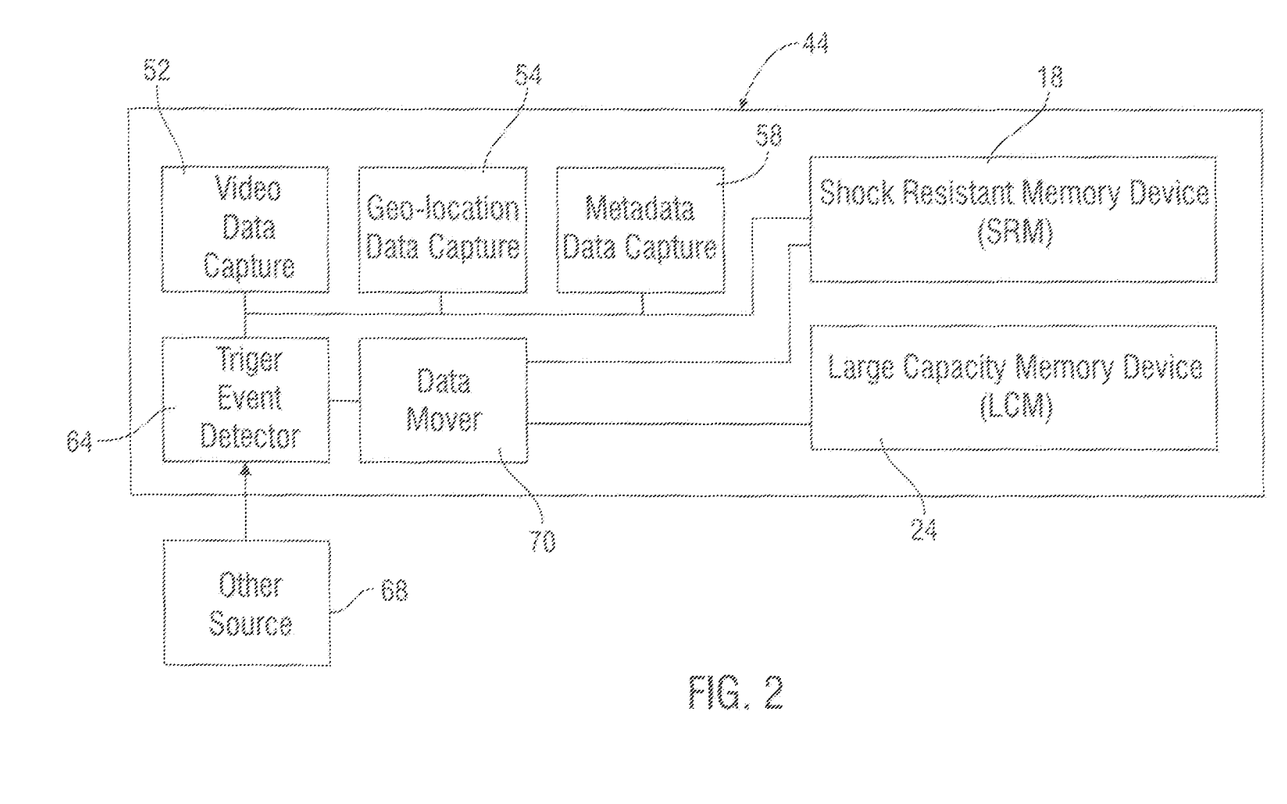
FIG. 2 is a block diagram illustrating various components the data management system of FIG. 1.
Figure 4:
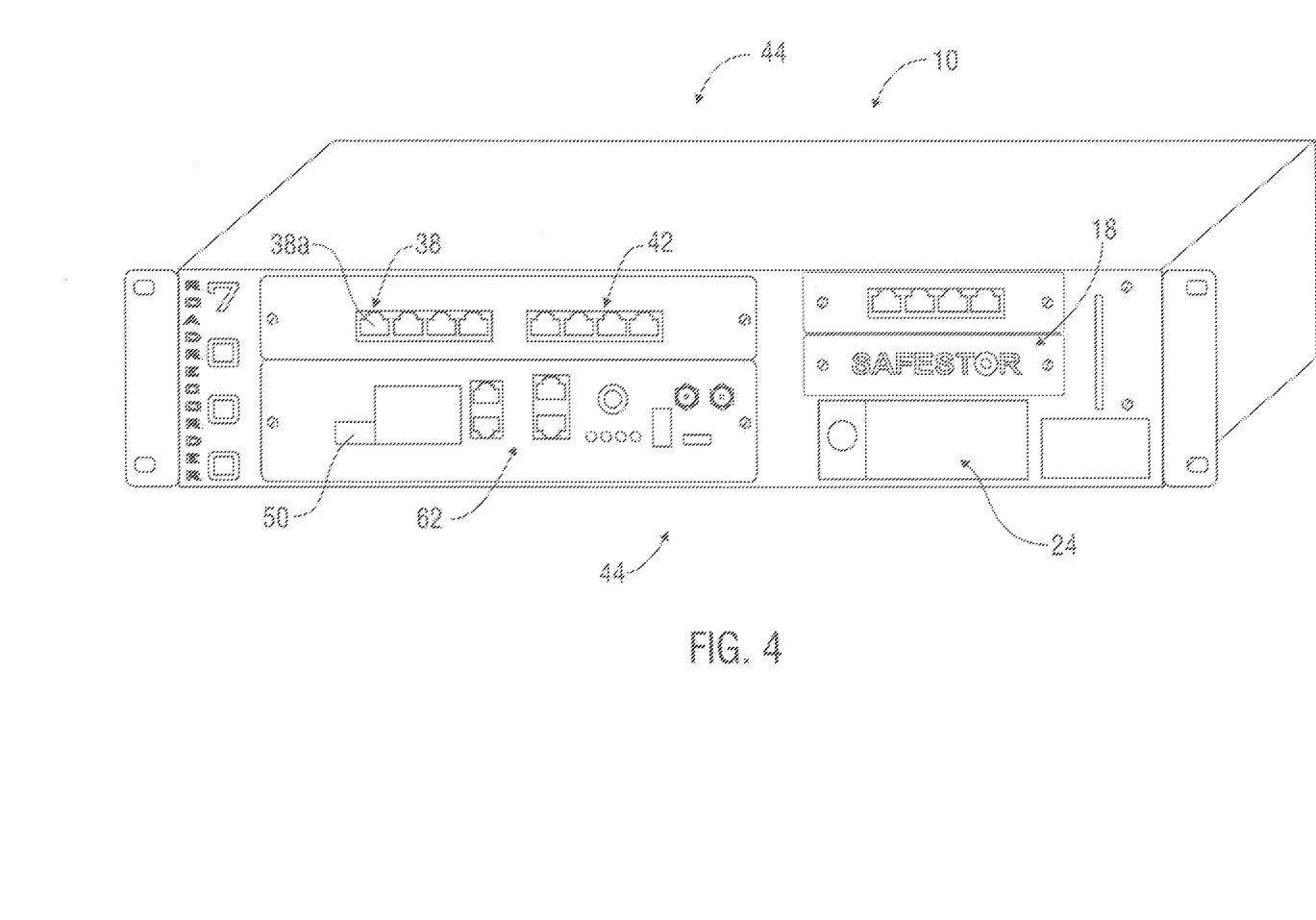
FIG. 4 is a front view of an exemplary control unit useful in the data management system of FIG. 1.

Now referring to FIG. 2, an embodiment of a data management system 44 is shown. The data management system 44 includes one or more computers, or other computer hardware and software components. The system 44 may be housed in a single control unit or multiple devices or locations. In FIG. 4, for example, the data management system 44 includes computer hardware and software components contained in a single control unit bearing the trademark Roadrecorder® 7000. As used throughout this patent, the term "computer" and variations thereof means a machine or device that can follow instructions to alter data in a desirable way to perform at least some operations without human intervention.

Referring back to FIG. 2, in this embodiment, video data capture computer software 52 is configured to receive data packets from the data source(s) 30 (e.g. video cameras 34, FIG. 1) and convert the data packets to video data, as is and becomes further known. The video data is retrieved and sent to the illustrated SRM 18 on a continuing, generally real-time basis, such as described above. The video data capture software 52 may be configured to also send video data attributes to the SRM 18. In this context, an "attribute" of the video data can be anything that may be contained in the video stream. For example, the cameras 34 may be able to detect things in the video, such as motion, face-recognition, one or more object left behind by a person or anything else programmed into the camera to be identified.

If desired, any other types of data may also be transmitted to the SRM 18 on a continuing, real-time or other basis. For example, the system 44 may include geo-location data capture computer software 54 configured to provide real-time geo-location data to the SRM 18. In this embodiment, the geo-location data capture software 54 communicates with one or more GPS antenna (not shown), which may be mounted on the vehicle 14 (e.g. FIG. 1). If desired, the geo-location data software 54 may associate geo-location data with the video data so that information in provided as to the geographic location of the video-recorded events. Likewise, the geo-location data software 54 may be configured to also send geo-location data attributes to the SRM 18.

For another example, the data management system 44 may include meta-data capture computer software 58 configured to record on-board event data based upon input from sensors or other on-board sources (not shown). In this embodiment, the meta-data capture software 58 is connected via multiple ports (e.g. ports 38, FIG. 4) to cables from multiple sensors (not shown) mounted at different desired locations on the vehicle. In other embodiments, the software 58 may use wireless communication with the sensors or other sources. Some potential examples of on-board events may be the opening of one or more door, window or compartment, the vehicle's direction and speed changes, brake system activity, etc. If desired, the meta-data capture software 58 may be configured to associate on-board event data with the video data. For example, on-board event data may indicate that the back door in the above bus example was opened at the same time a particular video-recorded event occurred. The meta-data capture software 58 may likewise be configured to send on-board event data attributes to the SRM 18.

Still referring to the embodiment of FIG. 2, the illustrated data management system 44 includes trigger event detection computer software 64 configured to initiate the transfer of data from the SRM 18 to the LCM 24. Any one or more desired trigger events may be used to initiate the transfer of data from the SRM 18 to the LCM 24 in any suitable manner. For example, a trigger event may be one or more on-board event, or attribute of on-board event data, as reported by the meta-data capture software 58. Some potential examples of on-board trigger events may be the release of pressure in the vehicle brake system, turning the vehicle ignition "off", locking vehicle doors, vehicle power restoration after loss, vehicle engine temperature changes, etc.

Another example of a trigger event may be one or more video-related event, or attribute of the video data, as reported by the video data capture software 52. One potential example is a particular duration of no recorded video data. Another example trigger event may be one or more event relating to, or attribute of, one or more data source 30 (FIG. 1), such as the deactivation or inactivity of one or more cameras 34. Still a further example trigger event may be one or more GPS event, or attribute of the geo-location data, as reported by the geo-location data capture software 54. For example, a trigger event may be the passage of a pre-determined duration of time without any repositioning of the vehicle 14 (e.g. FIG. 1) as reflected in the geo-location data. In this embodiment, the trigger event detection software 64 thus communicates with the cameras 34 (e.g. FIG. 1) and the software 52, 54 and 58. For example, in the above bus example, the system 44 may be configured with two required trigger events—deactivation of the vehicle ignition system based upon on-board event data and non-movement of the vehicle for a pre-determined time period based upon geo-location data.

Referring still to FIG. 2, in some embodiments, one or more trigger events may be reported to the trigger event detection software 64 by one or more "other" sources 68. The other source 68 could be any desired source. For example, the trigger event may be the actuation of a switch or button by the vehicle operator or other person. Other examples of trigger events from an other source 68 may relate to vehicle engine temperature, fuel or electric supply, brake system pressurization, accelerometer activity, etc. If desired, the system 44 may include multiple alternate or cumulative trigger events originating from any among one or more data source 30 (FIG. 1), computer software 52, 54 or 58 or other source 68 (if included).

In this embodiment, when the trigger event detection software 64 detects the occurrence of one or more required trigger events, it commands data mover computer software 70 to automatically transfer the data stored in the SRM 18 to the LCM 24. The data mover software 70 may be programmed to move all or a desired portion of the data in the SRM 18.

Now referring to FIG. 3, the data flow of a particular embodiment of the data management system 44 will now be described. As represented with Steps 72, 74, 76, the start or "on" state of the vehicle (not shown) and data management system 44 signifies the "on" or active state of the video data capture software 52, geo-location data capture software 54 and the meta-data capture software 58. At the same time, the data source(s) (not shown), such as digital video cameras 34 (e.g. FIG. 1) and other components associated with the exemplary data management system 44 (e.g. GPS antenna(s), sensors, etc.), are in an "on" or active state. The illustrated SRM 18 is in an "on" or active mode, while the exemplary LCM 24 is in an "off", "idle" or "sleep" mode.

In the active state, the exemplary video data capture software 52, geo-location data capture software 54 and the meta-data capture software 58 are receiving or retrieving data from their respective data sources and, if desired, organizing and/or the formatting data and creating attributes thereof, such as described above. For example, the exemplary video data capture software 52 is listening to the cameras 34 (e.g. FIG. 1). When video data is captured by the software 52, the software 52 may be programmed to create data files for the video data. For another example, the illustrated geo-location software 54 is listening to GPS satellites or other sources through the GPS antenna(s) (not shown). When data is received therefrom, the software 54 may create data files for the geo-location data. The exemplary meta-data capture software 58 is listening to the sensors or other on-board sources with which it communicates. When data is received therefrom, it may create data files for the on-board event data.

In this embodiment, as represented by Steps 78, 80 and 82, the software 52, 54 and 58 send the respective data elements to data compilation computer software 74. This software 74 may be programmed to create data files instead of, or in addition to, those provided by the software modules 52, 54 and 58, and/or perform other data related functions (e.g. organize or compile data from all three sources). In some embodiments, the data compilation software 74 may not be included or may perform other or additional functions. Moreover, the creation of files and the compilation, organization and formatting of data are not limiting upon the present disclosure.

In the illustrated embodiment, as soon as the respective data is captured by software 52, 54 and 58 and placed into files, formatted and/or organized (or at other designated times), the data is written to the SRM 18, as reflected by Step 84, while the vehicle is operating and may be moving. The exemplary system 44 is configured so that Steps 78, 80, 82 and 84 repeat on an automatic continuing basis.

Figure 3:
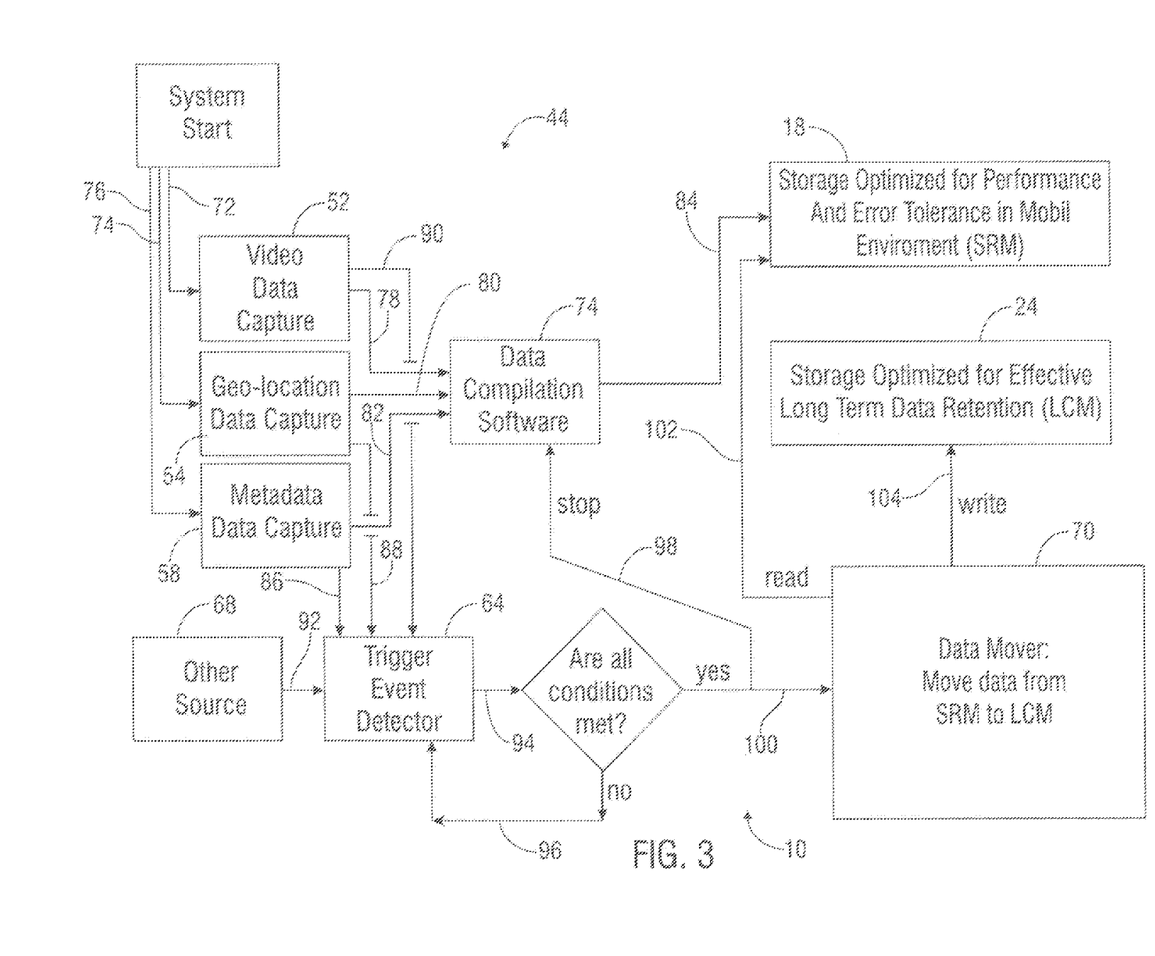
FIG. 3 is a flow diagram illustrating a process performed by an embodiment of the data management system of FIG. 1.

Still referring to the embodiment of FIG. 3, at the same time, the trigger event detection software 64 is listening for notifications of trigger events, as represented by Steps 86, 88, 90 and 92. For example, one or more trigger event notifications may come from one or more of the computer software modules 52, 54, 58 and or another source 68, such as described above. When one or more trigger event is detected, the trigger event detection software 64 determines if all required pre-established trigger conditions have been met for initiating a data transfer from the SRM 18 to the LCM 24, as represented by Step 94. For example, in the bus example above, trigger event notifications may be required from the geo-location data capture software 54 and the meta-data capture software 58 in order for the trigger event detection software 64 to initiate a data transfer.

If all pre-established trigger conditions are not met, the exemplary trigger event detection software 64 waits for further trigger event notifications (Step 96). If all pre-established trigger conditions are met, the illustrated software 64 (i) commands the software 52, 54, and 58 (or software 74), to cease writing data to the SRM 18, as represented by Step 98, and (ii) commands the data mover software 70 to write the data from the SRM 18 to the LCM 24 (Step 100). In this embodiment, the data mover software 70 then wakes up the LCM 24, reads data from the SRM 18 (Step 102) and writes the data to the LCM 24 (Step 104). Depending upon the embodiment, some or all of the data may be cut-and-pasted or copied-and-pasted to the LCM 24, as desired. In a preferred embodiment, all data is transferred from the SRM 18 to the LCM 24, so the memory of the SRM 18 is emptied. In other embodiments, some data may be left in the SRM 18, as desired.

Still referring to FIG. 3, after the exemplary LCM 24 receives the data, the data mover software 70 (or other software) may be configured to confirm data and system integrity, if desired. For example, the software 70 may verify that all data was properly read from the SRM 18 and written to the LCM 24, that the memory of the SRM 18 is empty, the SRM 18 and LCM 24 perform properly and the data in the LCM 24 is accessible for download, or a combination thereof. Thereafter, data on the exemplary LCM 24 may be retained or removed, retrieved or downloaded whenever desired, such as by cable, wireless communication or removal of the LCM 24 from the data management system 44. If desired, the system 44 may be configured to listen for incoming wireless (or hard-wired) computer requests for data from the LCM 24.

In this embodiment, after the data is moved from the SRM 18 to the LCM 24 and no data requests have been received for transfer from the LCM 24, the LCM 24 is put back into an "off", "idle" or "sleep" mode. If the LCM 24 is a hard disk drive, for example, its moving parts are moved into a parked position, such as to prevent damage due to shock, vibration or other movement of the vehicle. In some embodiments, the LCM 24 is completely powered off and put into a safe state until the next time it is waken up.

If desired, the system 44, data sources 30 (FIG. 1) and other associated components may be configured to be turned off until the vehicle ignition is restarted. In such instances, when the vehicle ignition is turned on, the exemplary system 44, including the SRM 18, and all other associated components will automatically power up, except the LCM 24, which will remain in an "idle", "sleep" or "off" mode. Thereafter, the software modules 52, 54, and 58 (and software 74, if included) resume receiving and writing data to the SRM 18 and the above methodology repeats on an automatic continuing basis.

In the example data management system 44 shown in FIG. 4, the illustrated control unit includes:
(i) a network interface;
(ii) video data capture software, which communicates with multiple (e.g. twelve) digital cameras via cable connection ports;
(iii) geo-location data capture software, which communicates with one or more GPS antennas;
(iv) meta-data capture software, which communicates with multiple (e.g. seven) on-board data sources via cable connection ports 38 (e.g., Pin 38a may be connected to the vehicle ignition system);
(v) trigger event detection software;
(vi) additional cable connection ports for "other" sources 42;
(vii) data mover software;
(viii) SRM 18;
(ix) LCM 24;
(x) power supply port 50 for connection to vehicle battery;
(xi) one or more antennas for wireless communication (e.g. via mobile device);
(xii) custom connection ports 62 for interface with user-specified equipment;
(xiii) one or more accelerometers; and
(xiv) one or more battery packs.

In some embodiments, the system 10 could be configured so that the data management system 44 is never turned off, but placed in a sleep mode when the vehicle ignition is off. If the system 44 includes one or more accelerometers (not shown) configured to detect motion at all times, the accelerometer(s) may be configured to wake up the system 10 (from the sleep mode) so that it operates similarly as described above if the vehicle is moved (e.g. by being jacked up, towed away or subject to an earthquake or other environmental change) or the system 44 (e.g. control unit) is moved (e.g. removed from the vehicle). For example, the cameras 34 could be instructed to record activity on/around the vehicle 14 and provide that video data to the video data capture software 52. For another example, the geo-location data software 54 could be activated to record GPS data as to the location of the system 44. If desired, the system 44 could be configured to transmit the data to a remote location wirelessly.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. A method of storing digital data in a moving vehicle and protecting the data from damage or loss due to vibration, shock or movement that may occur while the vehicle is operating, the method comprising:
provision of first and second digital data storage devices in the vehicle, the first digital data storage device not including any moving parts, the second digital data storage device including moving parts and having a greater digital data storage capacity than the first digital data storage device;
while the vehicle is moving during typical operating conditions,
transmitting the digital data to the first digital data storage device,
the first digital data storage device reliably storing the digital data without damage to or loss of the digital data while the first digital data storage device is subject to movement, vibration and shock due to operation and movement of the vehicle, and
maintaining the second digital data storage device in an "off" or "sleep" mode;
and
while the vehicle is stationary,
activating the second digital data storage device into an "on" mode, and transmitting digital data from the first digital data storage device to the second digital data storage device.

2. The method of claim 1 wherein the first digital data storage device is at least one solid state drive and the second digital data storage device is at least one hard disk drive.

3. The method of claim 1 further including
computer software receiving notification of at least one required trigger event, and
upon receipt of the at least one required trigger event, computer software temporarily activating the second digital data storage device into an "on" mode, temporarily suspending the transmission of data to the first digital data storage device and transferring the digital data from the first digital data storage device to the second digital data storage device.

4. The method of claim 3 wherein the at least one required trigger event includes turning off the vehicle's ignition.

5. The method of claim 3 wherein the at least one required trigger event includes at least one among particular vehicle brake system activity, particular GPS data, a particular vehicle engine temperature change, particular vehicle fuel supply activity, particular vehicle electric system activity, the restoration of power to the vehicle after a vehicle power loss, the passage of a certain duration of time without movement of the vehicle, one or more video data attribute, one or more geo-location data attribute and one or more on-board event data attribute.

6. The method of claim 3 further including, after transmitting the digital data from the first digital data storage device to the second digital data storage device, placing the second digital data storage device into an "off" or "sleep" mode.

7. The method of claim 6 further including after the digital data is transferred to the second digital data storage device, computer software verifying that all digital data was property transferred from the first to the second digital data storage devices and the digital data in the second digital data storage device is undamaged and ready for download therefrom.

8. The method of claim 1 further including multiple data sources on the vehicle providing different types of digital data to the first digital data storage device on an ongoing basis.

9. The method of claim 8 further including data compilation computer software receiving digital data from multiple data sources, compiling the digital data and creating files for the digital data and transmitting the digital data files to the first digital data storage device.

10. The method of claim 8 further including video data capture computer software receiving data packets from one or more digital video camera mounted on the vehicle on an continuing basis, converting the data packets to video data, and transmitting the video data to the first digital data storage device on a continuing basis.

11. The method of claim 10 further including geo-location data capture computer software receiving real-time geo-location data from at least one GPS antenna provided on the vehicle on a continuing basis and transmitting the geo-location data to the first digital data storage device on a continuing basis.

12. The method of claim 11 further including computer software associating the video data and geo-location data with each other to identify the geographic location of video-recorded events and transmitting that data to the first digital data storage device on a continuing basis.

13. The method of claim 10 further including meta-data capture computer software receiving on-board event data from at least one sensor provided on the vehicle on a continuing basis and transmitting the on-board event data to the first digital data storage device on a continuing basis.

14. The method of claim 13 wherein at least one among the opening of a window on the vehicle, the opening of a door on the vehicle, the opening of a compartment on the vehicle, a particular change of speed or direction of the vehicle is recorded as on-board event data provided to the meta-data capture computer software.

15. A method of storing real-time digital data in a moving vehicle and protecting the data from damage or loss due to vibration, shock or movement that may occur while the vehicle is operating, the method comprising:
providing at least one hard disk drive and at least on solid state drive on the vehicle;
while the vehicle is moving,
transmitting the digital data to the solid state drive on a continuing basis, and
maintaining the hard disk drive in an "off" or "sleep" mode; and
while the vehicle is stationary in response to computer software receiving notification of at least one required trigger event,
activating the hard disk drive into an "on" mode,
suspending the transmission of digital data to the solid state drive,
transmitting digital data from the solid state drive to the hard disk drive; and
after the digital data is transmitted to the hard disk drive, resuming the transmission of data to the solid state drive, and
placing the hard disk drive into an "off" or "sleep" mode.

16. The method of claim 15 further including video data capture computer software receiving data packets from multiple digital video cameras mounted on the vehicle on an continuing basis, converting the data packets to video data, and transmitting the video data to the solid state drive on a continuing basis.

17. The method of claim 16 further including geo-location data capture computer software receiving real-time geo-location data from at least one GPS antenna mounted on the vehicle on a continuing basis and transmitting the geo-location data to the solid state drive on a continuing basis.

18. The method of claim 17 further including meta-data capture computer software receiving on-board event data from at least one sensor provided on the vehicle on a continuing basis and transmitting the on-board event data to the solid stated drive on a continuing basis.

19. The method of claim 18 further including data compilation computer software receiving digital data from the video data capture computer software, geo-location data capture computer software and meta-data capture computer software, compiling the digital data and creating files for the digital data and transmitting the digital data files to the first digital data storage device.

20. The method of claim 19 further including placing the solid state drive, data compilation computer software, meta-data capture compute software, geo-location data capture computer software and video data capture computer software in a sleep mode when the vehicle ignition is off, further including one or more accelerometers on the vehicle detecting motion when the vehicle ignition is off and, in response, waking up the solid state drive, data compilation computer software, meta-data capture compute software, geo-location data capture computer software and video data capture computer software.

21. An article for use on a vehicle, the article comprising:
a machine readable memory that provides instructions, which when executed by a machine, cause the machine to perform operations comprising, transmitting digital data to a shock-resistant memory device on a continuing basis and maintaining a large capacity memory device in an "off" or "sleep" mode while the vehicle is moving, receiving notification of at least one required trigger event while the vehicle is stationary, and in response thereto, activating the large capacity memory device into an "on" mode, suspending the transmission of digital data to the shock-resistant memory device, transmitting digital data from the shock-resistant memory device to the large capacity memory device, and after the digital data is transmitted to the large capacity memory device, resuming the transmission of data to the shock-resistant memory device, and placing the large capacity memory device into an "off" or "sleep" mode.

22. System for storing real-time digital data in a vehicle and protecting the data from damage or loss due to movement that may occur while the vehicle is operating, the system comprising:

at least one hard disk drive and at least one solid state drive mounted in the vehicle, said at least one solid state drive not including any internal moving parts, said at least one hard disk drive having internal moving parts and a greater digital data storage capacity than said at least one solid state drive;

at least one computer mounted in the vehicle and having a machine readable memory that provides instructions, which when executed by the computer, cause the computer to perform operations including, while the vehicle is moving, transmitting digital data to said solid state drive on a continuing basis from one or more data source mounted in the vehicle and maintaining said hard disk drive in an "off" or "sleep" mode, when the vehicle is stationary, receiving notification of at least one required trigger event, activating said hard disk drive into an "on" mode, suspending the transmission of digital data to said solid state drive, transmitting digital data from said solid state drive to said hard disk drive, and after the digital data is transmitted to said hard disk drive, resuming the transmission of digital data to said solid state drive and placing said hard disk drive into an "off" or "sleep" mode.

23. The system of claim 22 wherein said at least one data source mounted in the vehicle is a plurality of digital video cameras and the digital data is digital video data.

* * * * *